(12) United States Patent
Matthae et al.

(10) Patent No.: US 8,988,780 B2
(45) Date of Patent: Mar. 24, 2015

(54) PLANAPOCHROMATICALLY-CORRECTED MICROSCOPE OBJECTIVE

(71) Applicant: Carl Zeiss Microscopy GmbH, Jena (DE)

(72) Inventors: Manfred Matthae, Jena (DE); Georg Herbst, Goettingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 209 days.

(21) Appl. No.: 13/655,851

(22) Filed: Oct. 19, 2012

(65) Prior Publication Data

US 2013/0100537 A1    Apr. 25, 2013

(30) Foreign Application Priority Data

Oct. 20, 2011 (DE) .......................... 10 2011 116 757

(51) Int. Cl.
*G02B 21/02* (2006.01)
*G02B 27/00* (2006.01)
*G02B 21/33* (2006.01)

(52) U.S. Cl.
CPC .......... *G02B 27/0068* (2013.01); *G02B 27/005* (2013.01); *G02B 21/02* (2013.01); *G02B 21/33* (2013.01)
USPC ........................................................ 359/656

(58) Field of Classification Search
CPC .............................. G02B 27/005; G02B 21/33
USPC ..................................................... 359/379, 656
See application file for complete search history.

(56) References Cited

U.S. PATENT DOCUMENTS 7,349,162 B2    3/2008  Fahlbusch et al.
2008/0106795 A1 *  5/2008  Shi et al. ...................... 359/656

FOREIGN PATENT DOCUMENTS

| DE | 26 55 041 A1 | 6/1978 |
|----|---|---|
| DE | 233 210 A1 | 2/1986 |
| DE | 10 2004 051 357 A1 | 4/2006 |

* cited by examiner

*Primary Examiner* — Joseph P Martinez
(74) *Attorney, Agent, or Firm* — Patterson Thuente Pedersen, P.A.

(57) ABSTRACT

The invention relates to a planapochromatically-corrected immersion microscope objective for high-resolution microscopy applications with changing dispersive immersion conditions, having a plurality of lenses and/or subsystems (T1, T2, T3) comprising lens groups and a corrective function (LA2) for eliminating spherical aberrations. According to the invention, the microscope objective has an additional corrective function (LA1) for eliminating longitudinal chromatic aberrations caused by dispersive changes in the immersion by changing the air gaps between the lenses or gap combinations, wherein the influence on the longitudinal chromatic aberration corresponds to a rotation of the curve $s(\lambda)$, which describes the color point (s) as a function of the wavelength ($\lambda$).

10 Claims, 3 Drawing Sheets

Microscope objective · Tube lens system

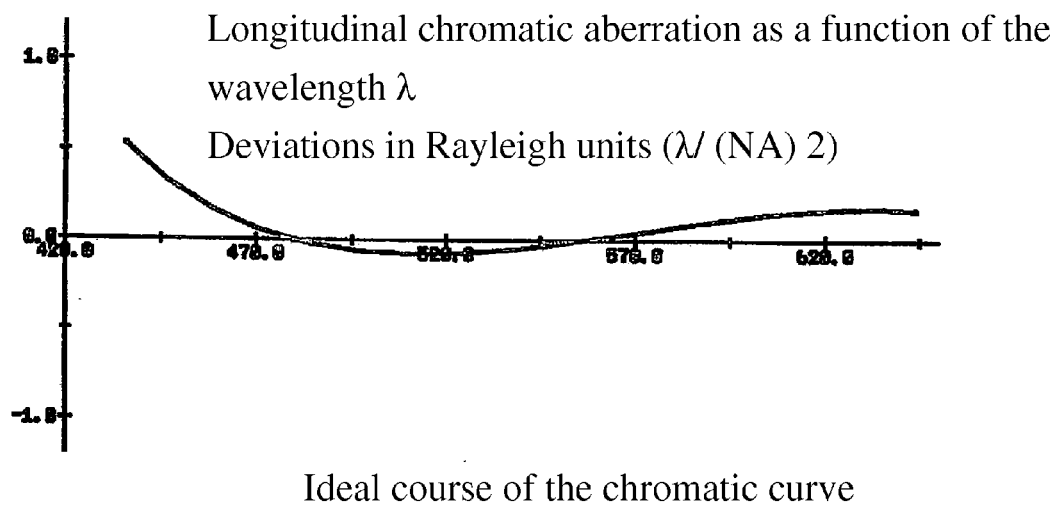
Ideal course of the chromatic curve
Figure 5
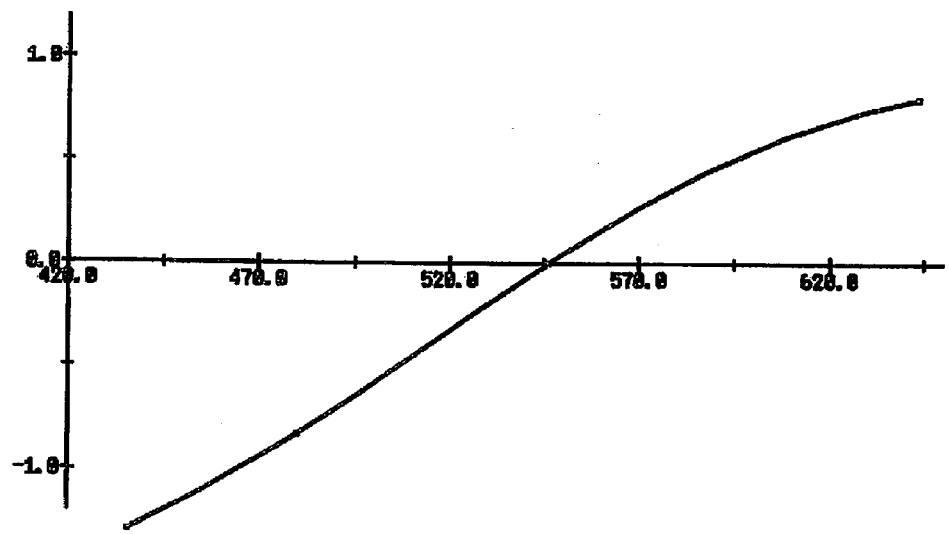
Figure 6    Course of the chromatic curve with the air gap LA1 changed by -0.1 mm

PLANAPOCHROMATICALLY-CORRECTED MICROSCOPE OBJECTIVE

CLAIM TO PRIORITY

This application claims the benefit of German Patent Application DE 102011116757.2 filed Oct. 20, 2011 the entire contents of which are incorporate by reference herein.

FIELD OF THE INVENTION

The invention relates to a planapochromatically corrected immersion microscope objective for high-resolution microscopy applications with changing dispersive immersion conditions, having a plurality of lenses and/or subsystems comprising lens groups and a corrective function for eliminating spherical aberrations.

BACKGROUND

In high-quality microscopy, it is of great significance that the object information is transmitted to the image plane free of so-called image errors (aberrations). If deviations from the calculated ideal conditions occur, aberrations are generated. One form of such aberrations are, e.g., necessary system tolerances, which are unavoidable for the manufacture of a cost-efficient microscope. The aberrations generated by the tolerances are, as a rule, eliminated with suitable adjustment options. However, during the everyday use of the microscope, there are also influences on the ideal conditions that cannot be changed with adjustments and lead to aberrations, which visibly degrade the optical image. Examples of such aberrations are thermal influences or tolerance deviations of the cover glasses to be used. For example, a deviation of the cover glass thickness by merely 0.01 mm can lead to a significant spherical aberration in high-aperture microscope objectives.

For applications in "live cell" microscopy, it is advantageous to operate with temperatures of up to 37 degrees Celsius. Once again, spherical aberrations occur. In order to create good working conditions for these applications as well, microscope objectives with a corrective function for eliminating the spherical aberration have been developed. This corrective function is realized using adjustable air gaps or air gap combinations between the optical elements of the microscope objective. E.g., such a solution is introduced in U.S. Pat. No. 5,940,220. Here, the distance changes are only allowed to influence the image error, which is generated by the type of application and supposed to be eliminated. This requires that such distance effects be specifically produced during the development phase of the optical system.

In modern microscopy, focusing into the sample is the increasingly preferred method. This changes the immersion condition, for which a special objective has been developed. Due to the spectral changes of the refractive index between the immersion and the sample, significant longitudinal chromatic aberrations, in addition to spherical aberrations, can occur even in the axis region which destroy the achromatic and apochromatic properties of a microscope objective, and therefore considerably degrade the chromatic image.

The same condition occurs when objectives with different immersions are used. Once the dispersive properties of the immersions deviate from one another, an additional longitudinal chromatic aberration is generated and the achromatic and apochromatic properties of a microscope objective are therefore also lost.

SUMMARY OF THE INVENTION

With the known corrective microscope objectives, which are designed for constant immersion conditions, the chromatic aberrations in the image cannot be eliminated. Proceeding from the disadvantages of the solution of the prior art, the invention addresses the problem of further developing a planapochromatically-corrected immersion microscope objective for high-resolution microscopy applications such that the spherical aberration errors and the longitudinal chromatic aberrations are eliminated in case of dispersive changes in the immersion and sample region (double-corrective microscope objective).

According to the invention, this problem is solved with a planapochromatic microscope objective of the initially described type through the features described herein.

According to the invention, the microscope objective has an additional corrective function for eliminating longitudinal chromatic aberrations caused by dispersive changes in the immersion by changing the air gaps between the lenses or gap combinations, wherein the influence on the longitudinal chromatic aberration corresponds to a rotation of the curve $s(\lambda)$ which describes the color point s as a function of the wavelength $\lambda$.

Proceeding from the object plane, the microscope objective according to an example embodiment comprises three subsystems, wherein the first subsystem comprises 2 collecting lenses which are bent in the direction of the object plane, the second subsystem comprises two double-cemented elements and one triple-cemented element, wherein the lenses oriented in the direction of the object plane are collecting lenses, the third subsystem comprises a double-cemented element and a triple-cemented element in a Gaussian-shaped arrangement, wherein the concave surface of the double-cemented element is facing the image and the concave surface of the triple-cemented element is oriented in the direction of the object plane.

The corrective function eliminates spherical aberrations through a change of the Nijboer-Zernike coefficient of the $3^{rd}$ order, a wavefront described by Nijboer-Zernike polynomials for the optical imaging of a point.

As a result of the two corrective functions, spherical aberrations, as well as longitudinal chromatic aberrations, can be eliminated with the microscope objective allowing for high-resolution microscopic examinations at changed immersions with only one objective. Furthermore, it is possible to focus into samples with different dispersive properties without losing the apochromatic function.

Advantageously, adjusting the air gap between the first lens and the second lens of the first subsystem enables the corrective function for changing the longitudinal chromatic aberration, wherein adjustments for changing the longitudinal chromatic aberration of $\pm 0.17$ mm are possible.

In an example embodiment, the adjustment of the air gap between the second lens of the first double-cemented element and the first lens of the second double-cemented element enables the corrective function of the spherical aberration for changing the Nijboer-Zernike coefficient of the $3^{rd}$ order.

Expediently, mechanical, manually operatable means are provided for changing the air gaps for the purpose of adjusting the corrective functions.

It is also conceivable to couple the objective with a control device for generating suitable air gaps, and, using target functions of optics programs, said control device would allow for recording and controlling the course characteristics of the air gaps.

The "double-corrective microscope objective", according to an example embodiment of the invention, is diffraction limited and apochromatically corrected, has an image field of 23 mm, a magnification of 20 and an aperture facing the object of 1.0 at a mean immersion refractive index of 1.3827 (slightly variable immersion). Despite the large aperture, the free working distance has a length of 5.6 mm at a parfocal length of 105 mm.

BRIEF DESCRIPTION OF THE DRAWINGS

In the following, the planapochromatically-corrected microscope according to the invention is further described in terms of one embodiment:

FIG. 5 is a depiction of the course of the longitudinal chromatic aberration; and FIG. 6 is a depiction of the rotation of the course of the chromatic curve from FIG. 5 with the air gap LA1 changed by −0.1 mm.

DETAILED DESCRIPTION

Figure 1:
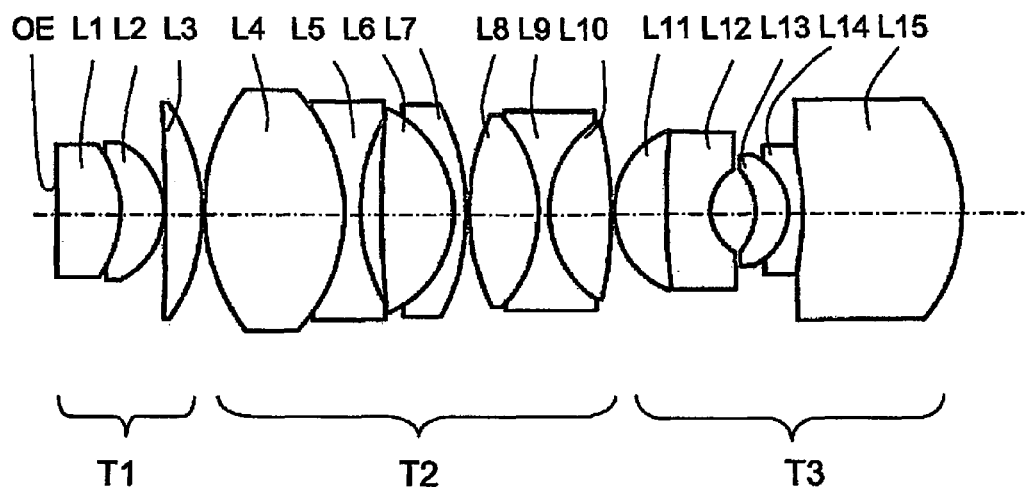
FIG. 1 is a depiction of the lens subsystems of the microscope objective.

FIG. 1 shows the lens arrangement of the three optical subsystems as seen from the object plane OE with the subsystems T1, T2, and T3.

The subsystem T1 comprises two single lenses L2 and L3, wherein both lenses are collecting lenses bent in the direction of the object plane OE. L1 denotes the immersion means.

The second subsystem T2 has a double-cemented element with the lenses L4 and L5, a further double-cemented element with the lenses L6 and L7, and a triple-cemented element with the lenses L8, L9, and L10, wherein the lenses L4, L6, and L8, which are oriented in the direction of the object plane OE, are collecting lenses.

The third subsystem T3 comprises a double-cemented element with the lenses L11 and L12, and a triple-cemented element with the lenses L13, L14, and L15, wherein the concave surface of the lens L12 of the double-cemented element is facing the image, and the concave surface of the lens L13 of the triple-cemented element is oriented in the direction of the object plane OE.

Figure 2:
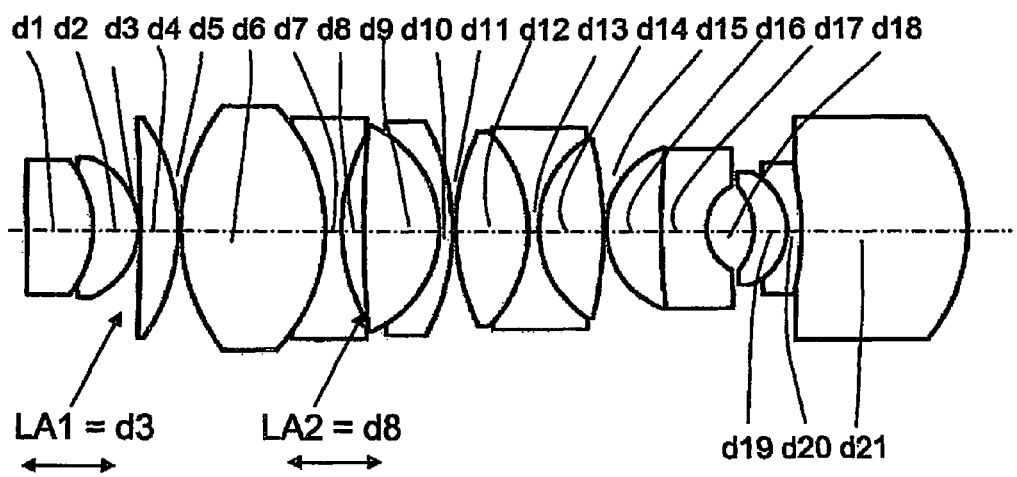
FIG. 2 is a depiction of the microscope objective with the reference signs of the design data for thicknesses and air gaps and the position of the corrective functions.

FIG. 2 depicts the air gaps between the lenses and the thicknesses d1 to d21 of the optical elements, and the corrective functions LA1 and LA2.

The corrective function LA2 eliminates spherical aberrations by changing the air gap d8 in the adjusting range of the Nijboer-Zernike coefficient of the $3^{rd}$ order.

The corrective function LA1 is used for adjusting the longitudinal chromatic aberration by rotating the curve $s(\lambda)$, which describes the color point s as a function of the wavelength $\lambda$. For that purpose, the air gap d3 is adjustable within an adjusting range of ±0.17 mm.

Figure 3:
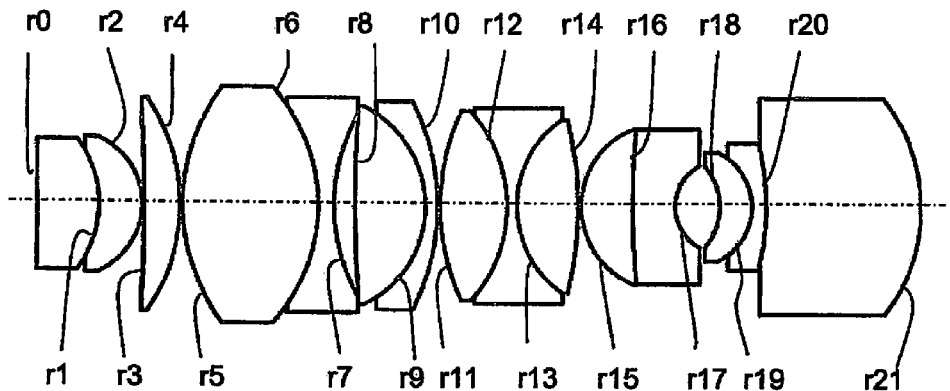
FIG. 3 is a depiction of the microscope objective with the reference signs of the design data for the radii of the single lenses.

FIG. 3 shows the microscope objective according to the invention with the radii r0 to r21 of the single lenses L2 to L15.

Figure 4:
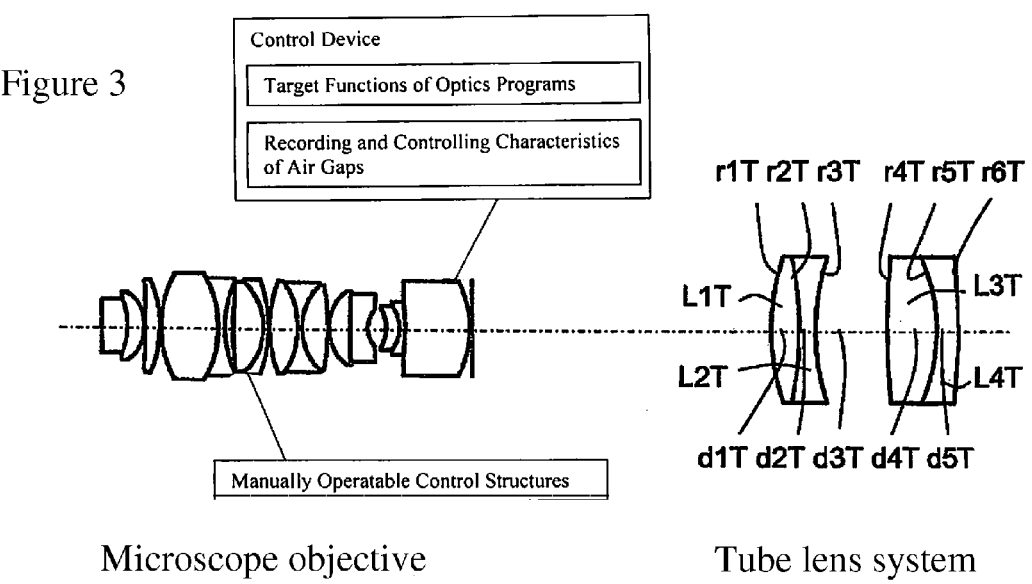
FIG. 4 is a depiction of the microscope objective with the downstream tube lens system.

FIG. 4 depicts the microscope objective with the downstream tube lens system, which is characterized through the lenses L1T to L4T, their thicknesses and/or air gaps between the optical elements d1T to d5T and their radii r1T to r6T.

A slightly variable, water-like immersion, an image field of 23 mm, a magnification of 20, an aperture of 1.0 facing the object, a free working distance of 5.6 mm and a parfocal length of 105 mm result in the following design data for the microscope objective, wherein r0 to r21 denote the radii of curvature in mm, d1 to d21 denote the thicknesses or air gaps in mm, $\nu e$ denotes the Abbe numbers, and ne denotes the refractive indices:

| Lens L1-L15 | Radius of curvature r0-r21 (mm) | Thickness d1-d21 (mm) | Refractive index $n_e$ | Abbe number $\nu_e$ |
|---|---|---|---|---|
| 1 | Infinite (immersion | 7.423 | 1.38271 | 51.64 |
| 2 | −12.2304 | 5.0 | 1.60897 | 43.43 |
|   | −8.5343 | LA1 = 0.18 | | |
| 3 | −191.127 | 4.18 | 1.63483 | 63.50 |
|   | −21.7538 | 0.277 | | |
| 4 | 22.712 | 15.92 | 1.65141 | 52.73 |
| 5 | −20.2422 | 1.81 | 1.64132 | 42.20 |
|   | 21.287 | LA2 = 2.42 | | |
| 6 | 127.0975 | 8.4 | 1.53019 | 76.58 |
| 7 | −12.6822 | 1.48 | 1.64132 | 42.20 |
|   | −25.851 | 0.28 | | |
| 8 | 24.938 | 8.1 | 1.439854 | 94.49 |
| 9 | −15.9619 | 1.2 | 1.64132 | 42.20 |
| 10 | 12.0575 | 7.3 | 1.59446 | 68.00 |
|   | −40.679 | 0.29 | | |
| 11 | 9.7156 | 6.0 | 1.59446 | 68.00 |
| 12 | 94.4084 | 4.98 | 1.88815 | 40.52 |
|   | 5.386 | 5.274 | | |
| 13 | −7.285 | 3.75 | 1.65222 | 33.60 |
| 14 | −6.979 | 1.6 | 1.73739 | 51.24 |
| 15 | −30.9464 | 18.58 | 1.79007 | 43.80 |
|   | −19.387 | 86.556 Distance to tube lens | | | with the following design data of the tube lens system, wherein r1T to r6T denote the radii of curvature in mm, d1T to d5T denote the thicknesses or air gaps in mm, $\nu e$ denotes the Abbe numbers, and ne denotes the refractive indices:

| Lens L1T-L4T | Radius of curvature r1T-r6T (mm) | Thickness d1T-d5T (mm) | Refractive index $n_e$ | Abbe number $\nu_e$ |
|---|---|---|---|---|
| 1 | 45.6448 | 8.0 | 1.57125 | 55.70 |
| 2 | −67.3134 | 4.5 | 1.72308 | 29.39 |
|   | 45.316 | 20.2 | | |
| 3 | 143.2827 | 14.6 | 1.59667 | 35.03 |
| 4 | −34.2288 | 6.3 | 1.51872 | 63.96 |
|   | −137.2633 | 63.36 Distance to image location | | |

FIG. 5 shows an ideal course of the chromatic curve, wherein the longitudinal chromatic aberration is depicted as a function of the wavelength $\lambda$ with deviations in Rayleigh units $(\lambda/(NA)^2)$. NA denotes the numerical aperture.

FIG. 6 shows a course of the chromatic curve with a change of the air gap d3 (corrective function LA1).

The invention may also include mechanical, manually operatable control structures for changing the air gaps (d3, d8) for the purpose of adjusting the corrective functions (LA1, LA2).

According to another example embodiment, the invention may include a control device coupled with the objective that generates suitable air gaps. The control device may include using target functions of optics programs. The control device may also allow for recording and controlling the course characteristics of the air gaps (d3, d8).

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

LIST OF REFERENCE SIGNS

L1 to L15 Lens of the microscope objective
d1 to d21 Thickness/air gap of the microscope objective
T1, T2, T3 Subsystem of the microscope objective
r0 to r21 Radii of the microscope objective
LA1, LA2 Corrective function
OE Object plane
L1T to L4T* Lens of the tube lens system
d1T to d5T Thickness/air gap of the tube lens system
r1T to r6T Radii of the tube lens system
λ Wavelength
s Color point
ne Refractive index
ve Abbe number

The invention claimed is:

1. A planapochromatically-corrected microscope objective for high-resolution microscopy applications with changing dispersive immersion conditions, comprising:
a plurality of lenses and/or subsystems comprising lens groups, having a first corrective function (LA2) that minimizes spherical aberration by changing air gaps or air gap combinations between the lenses, and
a second independent corrective function (LA1) that minimizes longitudinal chromatic aberration by changing air gaps or air gap combinations, wherein influence on the longitudinal chromatic aberration corresponds to a rotation of the curve s(λ) which describes color point(s) as a function of wavelength (λ).

2. The planapochromatically corrected microscope objective according to claim 1, comprising: three lens subsystems, wherein, proceeding from the object plane,
a first lens subsystem (T1) comprises two single lenses (L2, L3), and wherein both lenses (L2) and (L3) are collecting lenses which are bent in the direction of an object plane (OE),
a second lens subsystem (T2) comprises a double-cemented element with lenses (L4, L5), a further double-cemented element with lenses (L6, L7), and a triple-cemented element with lenses (L8, L9, L10), wherein the lenses (L4, L6, L8) are oriented in the direction of the object plane (OE) and are collecting lenses,
a third subsystem (T3) comprises a double-cemented element with lenses (L11, L12) and a triple-cemented element with lenses (L13, L14, L15) in a Gaussian-shaped arrangement, wherein a concave surface of lens (L12) of the double-cemented element is facing the image, and a concave surface of the lens (L13) of the triple-cemented element is oriented in the direction of the object plane (OE), and
the corrective function (LA2) changes the spherical aberration by changing a Nijboer-Zernike coefficient of a $3^{rd}$ order, varying a wavefront described by Nijboer-Zernike polynomials for the optical imaging of a point.

3. The planapochromatically-corrected microscope objective according to claim 2, wherein the corrective function (LA1) changes the longitudinal chromatic aberration by adjusting the air gap (d3) between the single lens (L2) and the single lens (L3) of the first subsystem (T1).

4. The planapochromatically-corrected microscope objective according to claim 2, wherein the corrective function (LA1) changes the longitudinal chromatic aberration by adjusting the air gap (d3) between the lens (L2) and the single lens (L3) of the first subsystem (T1).

5. The planapochromatically-corrected microscope objective according to claim 1, wherein the adjusting range for changing the longitudinal chromatic aberration is about ±0.17 mm.

6. The planapochromatically-corrected microscope objective according to claim 2, wherein an adjusting range for changing the longitudinal chromatic aberration is ±0.17 mm.

7. The planapochromatically-corrected microscope objective according to claim 2, wherein the corrective function (LA2) of the spherical aberration changes a Nijboer-Zernike coefficient of the $3^{rd}$ order by adjusting an air gap (d8) between the second lens (L5) of the first double-cemented element and the first lens (L6) of the second double-cemented element of the second subsystem (T2).

8. The planapochromatically-corrected microscope objective according to claim 1, further comprising mechanical, manually operatable structures for changing the air gaps (d3, d8) for the purpose of adjusting the corrective functions (LA1, LA2).

9. The planapochromatically-corrected microscope objective according to claim 1 further comprising a control device coupled with the objective that generates suitable air gaps (d3, d8), and wherein, using target functions of optics programs, said control device allows for recording and controlling course characteristics of the air gaps (d3, d8).

10. The planapochromatically corrected microscope objective according to claim 1, wherein the objective meets following design data with radii of curvature r0 to r21 in mm, thicknesses or air gaps d1 to d21 in mm, refractive indices ne, Abbe numbers ve, and the use of a slightly variable, water-like immersion, at an image field of 23 mm, a magnification of 20, an aperture of 1.0 facing the object, a free working distance of 5.6 mm and a parfocal length of 105 mm:

| Lens L1-L15 | Radius of curvature r0-r21 (mm) | Thickness d1-d21 (mm) | Refractive index $n_e$ | Abbe number $v_e$ |
| --- | --- | --- | --- | --- |
| 1 | Infinite (immersion) | 7.423 | 1.38271 | 51.64 |
| 2 | −12.2304 | 5.0 | 1.60897 | 43.43 |
|   | −8.5343 | LA1 = 0.18 |   |   |
| 3 | −191.127 | 4.18 | 1.63483 | 63.50 |
|   | −21.7538 | 0.277 |   |   |
| 4 | 22.712 | 15.92 | 1.65141 | 52.73 |
| 5 | −20.2422 | 1.81 | 1.64132 | 42.20 |
|   | 21.287 | LA2 = 2.42 |   |   |
| 6 | 127.0975 | 8.4 | 1.53019 | 76.58 |
| 7 | −12.6822 | 1.48 | 1.64132 | 42.20 |
|   | −25.851 | 0.28 |   |   |
| 8 | 24.938 | 8.1 | 1.439854 | 94.49 |
| 9 | −15.9619 | 1.2 | 1.64132 | 42.20 |
| 10 | 12.0575 | 7.3 | 1.59446 | 68.00 |
|   | −40.679 | 0.29 |   |   |

-continued

| Lens L1-L15 | Radius of curvature r0-r21 (mm) | Thickness d1-d21 (mm) | Refractive index $n_e$ | Abbe number $\nu_e$ |
|---|---|---|---|---|
| 11 | 9.7156 | 6.0 | 1.59446 | 68.00 |
| 12 | 94.4084 | 4.98 | 1.88815 | 40.52 |
|  | 5.386 | 5.274 |  |  |
| 13 | −7.285 | 3.75 | 1.65222 | 33.60 |
| 14 | −6.979 | 1.6 | 1.73739 | 51.24 |
| 15 | −30.9464 | 18.58 | 1.79007 | 43.80 |
|  | −19.387 | 86.556 Distance to tube lens |  |  | with following design data of the tube lens system, wherein r1T to r6T denote the radii of curvature in mm, and d1T to d5T denote the thicknesses or air gaps in mm:

| Lens L1T-L4T | Radius of curvature r1T-r6T (mm) | Thickness d1T-d5T (mm) | Refractive index $n_e$ | Abbe number $\nu_e$ |
|---|---|---|---|---|
| 1 | 45.6448 | 8.0 | 1.57125 | 55.70 |
| 2 | −67.3134 | 4.5 | 1.72308 | 29.39 |
|  | 45.316 | 20.2 |  |  |
| 3 | 143.2827 | 14.6 | 1.59667 | 35.03 |
| 4 | −34.2288 | 6.3 | 1.51872 | 63.96 |
|  | −137.2633 | 63.36 Distance to image location. |  |  |

* * * * *